(12) United States Patent
Liang et al.

(10) Patent No.: US 10,326,164 B2
(45) Date of Patent: Jun. 18, 2019

(54) HIGH-CONDUCTION GE SUBSTITUTED LIASS4 SOLID ELECTROLYTE

(71) Applicant: UT-Battelle, LLC, Oak Ridge, TN (US)

(72) Inventors: Chengdu Liang, Knoxville, TN (US); Nancy J. Dudney, Knoxville, TN (US); Ezhiylmurugan Rangasamy, San Jose, CA (US); Gayatri Sahu, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 188 days.

(21) Appl. No.: 15/060,109

(22) Filed: Mar. 3, 2016

(65) Prior Publication Data
US 2016/0261001 A1  Sep. 8, 2016

Related U.S. Application Data (60) Provisional application No. 62/127,334, filed on Mar. 3, 2015.

(51) Int. Cl.
*H01M 10/0562* (2010.01)
*H01B 1/06* (2006.01)
*H01M 10/052* (2010.01)

(52) U.S. Cl.
CPC .......... *H01M 10/0562* (2013.01); *H01B 1/06* (2013.01); *H01M 10/052* (2013.01); *H01M 2300/0068* (2013.01)

(58) Field of Classification Search
CPC .......... H01M 10/0562; H01M 10/052; H01M 2300/0068; H01B 1/06
(Continued)

(56) References Cited

U.S. PATENT DOCUMENTS

| | | | |
|---|---|---|---|
| 7,883,800 B2 | 2/2011 | Vinatier et al. | |
| 2009/0011339 A1* | 1/2009 | Seino | C03C 3/32 429/322 |

(Continued)

FOREIGN PATENT DOCUMENTS

| | | |
|---|---|---|
| CN | 1650450 | 4/2010 |
| WO | 2013051478 | 4/2013 |

OTHER PUBLICATIONS

"A high-conduction Ge substituted L3AsS4 solid electrolyte with exceptional low activation energy", by Gayatri Sahu et al. in Journal of Materials Chemistry A, 2014, 2, 10396-10403.*

(Continued)

*Primary Examiner* — Jonathan G Jelsma
*Assistant Examiner* — Omar M Kekia
(74) *Attorney, Agent, or Firm* — Fox Rothschild LLP (57) ABSTRACT

A solid electrolyte for a lithium battery includes $Li_{3+x}Ge_xAs_{1-x}S_4$ where x=0 to 0.50. The value of x can be a range of any high value and any lower value from 0 to 0.50. For example, x can be 0.25 to 0.50, and x can be 0.3 to 0.4, among many other possible ranges. In one embodiment x=0.33 such that the solid electrolyte is $Li_{3.334}Ge_{0.334}As_{0.666}S_4$. A solid electrolyte for a lithium battery can include $LiAsS_4$ wherein ½ to ⅔ of the As is substituted with Ge. A lithium battery and a method for making a lithium battery are also disclosed.

13 Claims, 8 Drawing Sheets

(58) Field of Classification Search
USPC .................................................. 429/322
See application file for complete search history.

(56) References Cited

U.S. PATENT DOCUMENTS

| | | |
|---|---|---|
| 2012/0015248 A1 | 1/2012 | Park et al. |
| 2013/0106029 A1 | 5/2013 | Snyder et al. |
| 2015/0147597 A1* | 5/2015 | Otomo .................. H01M 4/134 429/7 |

OTHER PUBLICATIONS

Wang et al.: "Thermal runaway caused fire and explosion of lithium ion battery", Journal of Power Sources 2012, 208, 210.
Venables, M. Engineering & Technology 2013, 8, 24.
Fergus : "Ceramic and polymeric solid electrolytes for lithium-ion batteries", Journal of Power Sources 2010, 195, 4554.
Knauth : "Inorganic solid Li ion conductors: An overview", Solid State Ionics 2009, 180, 911.
Takada: "Progress and prospective of solid-state lithium batteries", Acta Materialia 2013, 61, 759.
Kanno et al.: "Synthesis of a new lithium ionic conductor, thio-LISICON-lithium germanium sulfide system", Solid State Ionics 2000, 130, 97.
Kaib et al.: "Lithium Chalcogenidotetrelates: Light Synthesis and Characterization of New Li+ Ion Conducting Li/Sn/Se Compounds", Chemistry of Materials, S. Chem. Mater., Article ASAP 2013, DOI: 10.1021/cm400541n.
Kamaya et al.: "A lithium superionic conductor", Nature Materials, vol. 10, Jul. 31, 2011.
West et al.: "In Solid State Electrochemistry", Cambridge University Press: Cambridge, U.K. , 1995.
Maekawa et al.: "Halide-Stabilized LiBH4, a Room-Temperature Lithium Fast-Ion Conductor", JACS Communications, Sep. 25, 2008.
Bron et al.: "Li10SnP2S12: An Affordable Lithium Superionic Conductor", J. Am. Chem. Soc 2013, 135, 5694.
Sahu et al.: "Air-stable, high-conduction solid electrolytes of arsenic-substituted Li4SnS4", Energy & Environmental Science 2013, DOI.
Rodrigues et al.: "Lithium Conducting Glasses: The Li2O BO2O3 TeO2 System", Solid State Ionics 1988, 28, 729.
Silbernagel et al."Air-stable, high-conduction solid electrolytes of arsenic-substituted Li4SnS4" Journal Chemical Physics 1976, 64, 3670.
Tachez, et. al: "Ionic Conductivity of and Phase Transition in Lithium Thiophosphate Li 3 PS 4", Solid State Ionics 1984, 14, 181.
Liu et al.: "Anomalous High Ionic Conductivity of Nanoporous-Li3PS4", Journal of the American Chemical Society, 2013, 135, 975?978.
Liang, C. J Am Chem Soc. 2013, 135, 975.
Thokchom et al.: "Composite effect in superionically conducting lithium aluminium germanium phosphate based glass-ceramic", Journal of Power Sources 2008, 185, 480.
Fu et. al: "Fast Li ion conducting glass-ceramics in the system Li2O—Al2O3—GeO2—P2O5", Solid State Ionics 1997, 104, 191.
Rangasamy et al: "The role of Al and Li concentration on the formation of cubic garnet solid electrolyte of nominal composition Li7La3Zr2O12", Solid State Ionics 2012, 206, 28.
West: "Basic Solid State Chemistry", Second ed.; Wiley & Sons, Incorporated, John, 1999, paperback.
Yoshikatsu et al.: "A sulphide lithium super ion conductor is superiorto liquid ion conductors for use in rechargeable batteries", M. Energy and Environmental Science 2014, 627.
Murayama et al.: "Structure of the thio-LISICON, Li4GeS4", Solid State Ionics 2002, 154, 789.
Chen: "Electrochemical Behavior of the Li+ /Li Couple and Stability of Lithium Deposits in Tri-1-butylmethylammonium bis((trifluoromethyl)sulfonyl)imide Room Temperature Ionic Liquid", Journal of the Chinese Chemical Society 2006, 53, 1017.
Loebich et al.: "Reactions between Some Alkali and Platinum Group Metals", Platinum Metals Review 1981, 25, 113.
Maldonado-Manso et al.: High Lithium Ionic Conductivity in the Li1+xAlxGeyTi2-x-y(PO4)3 NASICON Series, Chem. Mater. 2003, 15, 1879-1885.

* cited by examiner

HIGH-CONDUCTION GE SUBSTITUTED LIASS4 SOLID ELECTROLYTE

CROSS-REFERENCE TO RELATED APPLICATION

This Application claims priority to U.S. Provisional application No. 62/127,334, filed Mar. 3, 2015, entitled High-Conduction Ge Substituted $Li_3AsS_4$ Solid Electrolyte with Exceptionally Low Activation Energy, the entirety of which is incorporated herein by reference.

STATEMENT REGARDING FEDERALLY SPONSORED RESEARCH

This invention was made with government support under contract No. DE-AC05-00OR22725 awarded by the United States Department of Energy. The government has certain rights in this invention.

FIELD OF THE INVENTION

The present invention relates generally to batteries, and more particularly to solid state batteries.

BACKGROUND OF THE INVENTION

The efficient harvesting and delivery of renewable energy supplies are the future of sustainable energy production. Energy storage is critical to enable a stable supply of energy from available energy resources. With the current growth in need of portable consumer electronics, it demands much safer, high-density, light-weight, compact batteries. Although lithium-ion (Li-ion) batteries are widely used in portable electronics, their large scale application is still limited by low energy density, relative high cost of material production, and safety issues. Replacing carbonate based electrolytes by non-volatile and thermally stable solid electrolytes is one of the solutions to solve the crucial problems currently associated with liquid electrolytes. Although solid electrolytes are non-flammable, their low ionic conductivities, relative high activation energy, and interfacial resistance hinder their practical applications.

The ionic conductivity of solid electrolytes usually changes dramatically with temperature because of the relatively high activation energy of solid electrolytes. Stable performance under changing temperature environments in a solid state device is a great challenge. Therefore, low activation energy in a material is crucial to achieve consistent performance of the device in a broad temperature range, especially below room temperature. Similarly, high activation energy in a solid state device could give rise to serious issues in material processing under changing temperature environments. Therefore, low activation energy in a material is necessary to achieve consistent performance of the device in a broad temperature range especially below room temperature.

Interfacial resistance is another important factor that cannot be ignored when it comes to the practical application of solid electrolytes in all-solid-state devices. For example, a fast lithium superionic conductor $Li_{10}GeP_2S_{12}$ has been reported by Kamaya et al., the conductivity of which reached $10^{-2}$ S cm$^{-1}$ at room temperature. Since the lithium ion transference number in this solid electrolyte is unity, the lithium ion conductivity is even higher than carbonate-based liquid electrolytes. However, metallic Li compatibility still remains a challenge to be resolved.

SUMMARY OF THE INVENTION

A solid electrolyte for a lithium battery includes $Li_{3+x}Ge_xAs_{1-x}S_4$ where x=0 to 0.50. The solid electrolyte can have x=0.25 to 0.5. The solid electrolyte can have x=0.3 to 0.4. In one embodiment of the solid electrolyte x=0.33.

The solid electrolyte can have an ionic conductivity of greater than 1 mScm$^{-1}$ at 27° C. The solid electrolyte can have an ionic conductivity of at least 1.12 mScm$^{-1}$ at 27° C. The solid electrolyte can have an activation energy of no more than 0.3 eV.

A lithium battery includes a solid electrolyte. The solid electrolyte includes $Li_{3+x}Ge_xAs_{1-x}S_4$, wherein x=0 to 0.50. The lithium battery can have a solid electrolyte wherein x=0.25 to 0.50. The lithium battery can have a solid electrolyte wherein x=0.3 to 0.4. In one embodiment the lithium battery can have a solid electrolyte wherein x=0.33.

The lithium battery can include an electrolyte with an ionic conductivity of greater than 1 mScm$^{-1}$ at 27° C. The lithium battery can include an electrolyte with an ionic conductivity of at least 1.12 mScm$^{-1}$ at 27° C. The lithium battery can have an electrolyte with an activation energy of no more than 0.3 eV.

A method of making a lithium battery can include the steps of providing an anode and a cathode, and positioning between the anode and the cathode a solid electrolyte, wherein the electrolyte comprises $Li_{3+x}Ge_xAs_{1-x}S4$ where x=0 to 0.50.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

A solid electrolyte for a lithium battery includes $Li_{3+x}Ge_xAs_{1-x}S_4$ where x=0 to 0.50. The value of x can be a range of any high value and any lower value from 0 to 0.50. For example, x can be 0.25 to 0.5, and x can be 0.3 to 0.4, among many other possible ranges. In one embodiment x=0.33 such that the solid electrolyte is $Li_{3.334}Ge_{0.334}As_{0.666}S_4$.

The solid electrolyte can have an ionic conductivity of greater than 1 mScm$^{-1}$ at 27° C. The solid electrolyte can have an ionic conductivity of at least 1.12 mScm$^{-1}$ at 27° C. The solid electrolyte can have an activation energy of no more than 0.3 eV.

A lithium battery can include a solid electrolyte where the electrolyte includes $Li_{3+x}Ge_xAs_{1-x}S_4$, wherein x=0 to 0.50. The value of x for the electrolyte of the battery can be a range of any high value and any lower value from 0 to 0.50. A lithium battery can include a solid electrolyte, where the solid electrolyte includes $LiAsS_4$ wherein ½ to ⅔ of the As is substituted with Ge. The battery can have any suitable construction.

A method of making a lithium battery can include the steps of providing an anode and a cathode, and positioning between the anode and the cathode a solid electrolyte, wherein the solid electrolyte comprises $Li_{3+x}Ge_xAs_{1-x}S_4$ where x=0 to 0.50.

The method of making a solid electrolyte can include the steps of providing $Li_3AsS_4$ and $Li_4GeS_4$ at the target molar ratio mixing the $Li_3AsS_4$ and $Li_4GeS_4$, and sintering the $Li_3AsS_4$ and $Li_4GeS_4$ mixture to form $Li_{3+x}Ge_xAs_{1-x}S_4$ where x can be from 0 to 0.50. The molar ratio of $Li_3AsS_4$ and $Li_4GeS_4$ can be formulated to give x can be from 0 to 0.5 or a value between 0 to 0.5.

The high conducting sulfide solid electrolytes are achieved via aliovalent substitution of Ge into $Li_3AsS_4$. The highest conduction phase showed twofold increase in the ionic conductivity and one of the lowest reported activation energies in lithium superionic conductors. Lithium compatibility can be achieved by surface passivation through chemical treatment.

The starting materials were $Li_2S$ (Sigma-Aldrich, 99.9% purity), $GeS_2$ (Sigma-Aldrich, 99.9% purity), and $As_2S_5$ (Sigma-Aldrich, 99.9% purity) and were used as received. All materials were weighed, mixed in required molar ratios of $Li_2S:As_2S_5:GeS_2$ in an Air-filled glove box, placed onto an Agate mortar and pestle and hand ground for 30 min. The molar ratios were determined keeping a trend in As to Ge ratio based on the two reactions given below:

$$3Li_2S+As_2S_5 \rightarrow 2Li_3AsS_4 \quad (1)$$

$$2Li_2S+GeS_2 \rightarrow Li_4GeS_4 \quad (2)$$

The powdery mixture was then carefully sealed in Pyrex glass tubes under house vacuum and heated at the reaction temperature of 550° C. for 12 h in a furnace. The temperature was then decreased in a slow rate to 450° C. in 12 h. After reacting, the tube was slowly cooled to room temperature in 4 h.

Powder X-ray diffraction (XRD) patterns were collected on X'pert Pro Powder Diffractometer (PANalytical) with copper Kα line radiation (λ≈1.5418 Å). The operating voltage and current were 45 kV and 40 mA respectively. The XRD characterization was handled with special care not to contact with air and moisture. Electron imaging was performed on a field emission scanning electron microscope (FESEM) (Zeiss Merlin) at 10 kV. The X-ray microanalysis elemental maps of elements were taken using the energy dispersive spectroscope (EDAX) detector attached to the FESEM system.

All materials were cold pressed into dense pellets with sufficient mechanical strength for the measurements of ionic conductivity. Pellets (diameter 1.27 cm, thickness~0.06 cm) were prepared by pressing the powder with carbon-coated aluminum foils (a sample from Exopack) on both sides in an argon-filled glove box. The carbon-coated aluminum foils served as blocking electrodes.

A symmetric cell test was conducted on a passivated pellet because of the chemical reaction of the solid electrolyte with metallic Li. The passivation solution is a mixture of lithium borohydride and Li iodide (3LiBH$_4$.LiI) with a molar ratio of 3:1 in tetrahydrofuran (THF). The concentration is 5 wt. % of solid content in THF. The composition of the 3:1 molar ratio LiBH$_4$/LiI is expected to be a high-conduction solid electrolyte that is compatible with metallic Li. The coating was applied by dipping the $Li_{3.334}Ge_{0.334}As_{0.666}S_4$ pellet into the composite solution and vacuum drying at 170° C. for 1 h. Two pieces of Li foil were attached to the coated pellet for a symmetric cell test. The symmetric cells were cycled on a battery test system (Maccor 4000) with a current density of 0.1 mAcm$^{-2}$ at room temperature. Other passivation materials and methods are possible.

Figure 1:
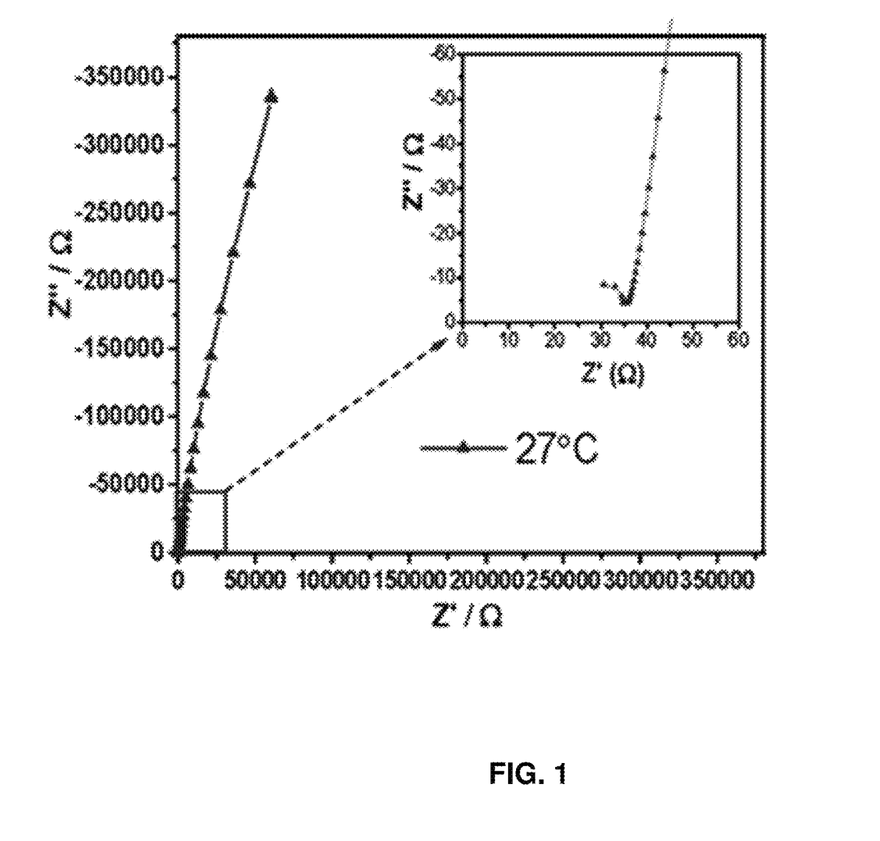
FIG. 1 is a plot of the impedance spectrum (Z"/Ω vs Z'/Ω) of $Li_{3.334}Ge_{0.334}As_{0.666}S_4$ measured at room temperature.

Electrochemical impedance spectroscopy (EIS) measurements were carried out using a specially designed air-tight cell. The AC impedance measurements were conducted in the frequency range of 1 MHz to 1 Hz with the amplitude of 100 mV by using a frequency response analyser (Solartron 1260). FIG. 1 is a plot of the impedance spectrum Z"/Ω vs Z'/Ω of $Li_{3.334}Ge_{0.334}As_{0.666}S_4$ measured at room temperature. The total conductivity is determined by using the intercept between the semi-arc and straight line as the total resistance. The Nyquist plot shows a typical semicircle at higher frequency region that represents the bulk and grain boundary resistance of the electrolyte and a spike at lower frequency region that represents the diffusion due to blocking electrode, a characteristic feature expected for pure ionic conductors. The intercept of the spike at the axis of Z'(Ω) was employed to determine the total ionic conductivity. For the Arrhenius plot, temperature was controlled between 25 to 100° C. with 10° C. intervals subsequent to 30° C. in a temperature chamber (Maccor, ±0.5° C.). To ensure the accuracy of measurements, every Arrhenius plot was measured by a forward scan from low to high temperature and a backward scan by reversing the temperature.

The cyclic voltammogram (CV) was measured on a 3LiBH$_4$.LiI coated Li/$Li_{3.334}Ge_{0.334}As_{0.666}S_4$/Pt cell where Li and Pt serve as the reference and counter electrodes respectively. The potential was scanned from −0.5 to 5.0 V vs. Li/Li$^+$ at a scan rate of 1mVs$^{-1}$ between −0.5V and 5.0 V at room temperature by using a potentiostat (Bio-Logic VMP3).

The DC polarization measurement was conducted to determine the electronic conductivity of the solid electrolyte. Each side of a cold pressed pellet (diameter 1.27 cm, thickness~0.06 cm) was coated with 100 nm Au (99.9999%) serving as the blocking electrode. The pellet was sealed in a Swagelok cell in an Ar filled glove box. Conductivity measurements were carried out using a potentiostat (Bio-Logic VMP3) with a low-current probe where the lowest measurable current is smaller than 1 pA. The voltage was held at each step for 10 hours, and the stabilized current was recorded as an indication of the electronic conductivity. A Faraday cage was used during the measurement. The electronic conductivity and ionic transference number of $Li_{3.334}Ge_{0.334}As_{0.666}S_4$ were measured.

Figure 2:
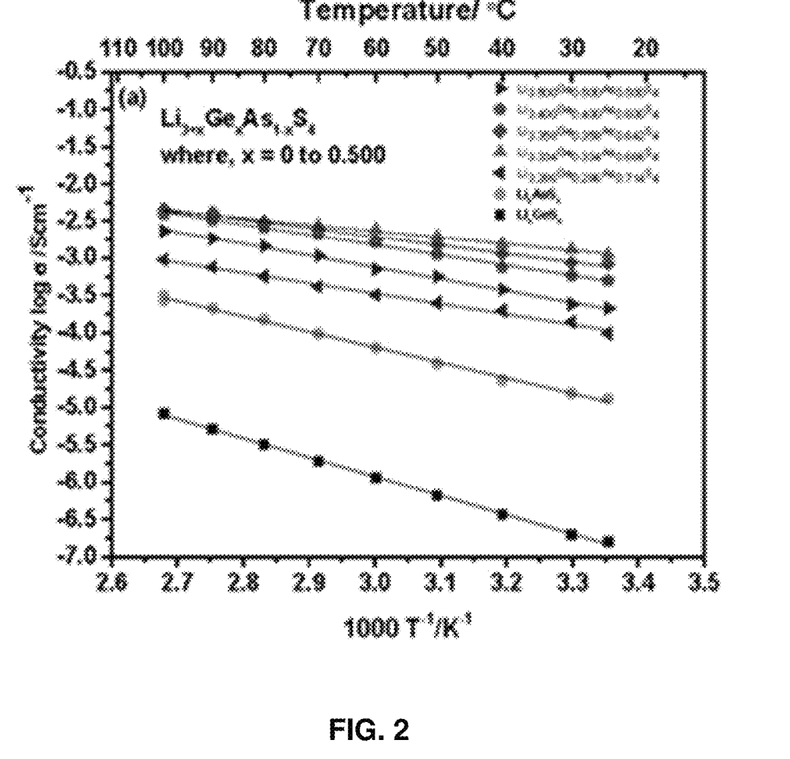
FIG. 2 is a comparative Arrhenius plot of the ionic conductivity of $Li_4GeS_4$, $Li_3AsS_4$ and Ge doped $Li_3AsS_4$, $Li_{3+x}Ge_xAs_{1-x}S_4$ (where, x=0 to 0.500) with various molar ratios of As:Ge.

Temperature dependence of the ionic conductivity of the samples for various molar ratios of As to Ge was studied. Samples were prepared by mechanical grinding and subjecting to solid state reactions under high vacuum. FIG. 2 presents a comparative Arrhenius plot of ionic conductivity of $Li_4GeS_4$, $Li_3AsS_4$ and Ge doped $Li_3AsS_4$, $Li_3AsS_4$, $Li_{3+x}Ge_xAs_{1-x}S_4$ (where, x=0 to 0.500) with various molar ratios of As:Ge. FIG. 2 represents typical Arrhenius plot for the Li-ion conductivity in the range of 25 to 100° C. as a function of 1000/T for various molar ratios of the samples. The room temperature (RT) ionic conductivity achieved for the highest Ge concentration $Li_{3.500}Ge_{0.500}As_{0.500}S_4$ was $2.12\times10^{-4}$ Scm$^{-1}$ and for the lowest Ge concentration $Li_{3.286}Ge_{0.286}As_{0.714}S_4$ was $9.80\times10^{-5}$ Scm$^{-1}$. The highest conductivity achieved across the entire temperature range was $1.12\times10^{-3}$ Scm$^{-1}$ at 25° C. and $4.47\times10^{-3}$ Scm$^{-1}$ at 100° C. for the composition $Li_{3.334}Ge_{0.334}As_{0.666}S_4$. For sulfides with compositions consisting of group VA (P and As) and IVA (Ge and Sn) elements, the highest conduction phases are in a stoichiometric ratio of P:Ge, and P:Sn of 2:1, with one exception in the combination of As and Sn with stoichiometric ratio of As:Sn=1:5. A comparison with the results reveals that the stoichiometric ratio of As:Ge=2:1 is consistent with previous reports and thus a higher Li+ion conductivity is expected.

To compare the effect of Ge substitution on the conductivity of the material, pristine $Li_3AsS_4$ and $Li_4GeS_4$ were also synthesized using a solid state synthesis route and comparative analysis was carried out. The calculated AC impedance measurements and the Arrhenius plots were generated in the range of 25 to 100° C. as a function of 1000/T. A clear observation was that the room temperature ionic conductivities of undoped $Li_4GeS_4$ and $Li_3AsS_4$ were $1.60\times10^{-7}$ Scm$^{-1}$ and $1.31\times10^{-5}$ Scm$^{-1}$ respectively. The conductivities of parent compounds were a few orders of magnitude lower than the Ge doped composition $Li_{3.334}Ge_{0.334}As_{0.666}S_4$. For solid electrolytes, introduction of a foreign element into the crystal lattice via aliovalent substitution disrupts the regular ordered lattice of well-crystalline materials and therefore provides a high concentration of defects and interstitials. Fine tuning of the lattice size and optimization of the carrier concentration in the skeleton framework by aliovalent cation substitution gave a superionic conductivity in mS/cm$^{-1}$ range. This finding indicates the sample composition $Li_{3.334}Ge_{0.334}As_{0.666}S_4$ and sintering temperature of 550° C. is the suitable combination to generate high ionic conduction phase.

An ideal solid electrolyte should be a pure ionic conductor, in which the lithium-ion transference number is 1. For sulfide-based solid electrolytes, the concern is the contribution of electronic conductivity to the total conduction of the solid electrolyte. In order to evaluate the transport properties of the Ge-substituted $Li_3AsS_4$, the electronic conductivity was measured through the DC polarization measurements, which gave a value of $3.7\times10^{-10}$ S cm$^{-1}$. The calculated Li$^+$ transference number is 0.9999, which is much higher than liquid and polymer electrolytes. In practical applications, the effective Li-ion conductivity determines the performance of the electrolyte. The effective conductivity of Li-ions is calculated by multiplying the total conductivity with the Li-ion transference number. A comparative analysis of various Li$^+$ transference numbers along with their effective Li$^+$ conductivities has been given in Table 1. Based on the data given, it is noteworthy that the solid electrolyte under study has an effective Li$^+$ conductivity comparable to the liquid electrolytes used in Li-ion batteries. From this comparative Li$^+$ transference number analysis between liquid, polymer and the new phase solid electrolyte, it is evident that the new sulfide solid electrolyte under study has a Li$^+$ transport number close to unity (electronic conductivity in the range of $10^{-9}$-$10^{-10}$ S/cm) considering Li$^+$ as the only mobile species in the lattice.

A major factor influencing the ionic conductivity at different compositions is the activation energy for faster ion mobility because it corresponds to the energy barrier for ionic conduction. Changes in activation energy have been observed for a motion resulting from the increasing population of higher potential energy sites in the conduction network. The activation energies Ea for the conduction were evaluated using the equation $$\sigma_T = \sigma_o \exp(-Ea/k_\beta T) \qquad (3)$$

where $\sigma_T$ is the total electrical conductivity, $\sigma_o$ is the pre-exponential parameter, T is absolute temperature, Ea is the activation energy and $k\beta$ is the Boltzmann constant. The Ea for conduction, calculated from the slope of an Arrhenius plot, was 0.31 eV and 0.27 eV for $Li_{3.500}Ge_{0.500}As_{0.500}S_4$ and $Li_{3.286}Ge_{0.286}As_{0.714}S_4$, respectively, whereas the Ea for the composition As:Ge=2:1, $Li_{3.334}Ge_{0.334}As_{0.666}S_4$, was 0.17 eV, which is the lowest among all other molar ratio compositions. The low activation energy favors the practical applications of solid electrolytes in a broad temperature range.

TABLE 1

Comparison of transference number of Li$^+$ (tLi$^+$) and effective Li$^+$ conduction values for various electrolytes

| Electrolytes | Type of Electrolyte | Li transference number Li t+ | Corresponding σ (S/cm) | Effective Li+ transport number | References |
|---|---|---|---|---|---|
| N-butyl-N-methyl-pyrrolidinium bis(trifluoromethanesulfonyl)imide (BMP-TFSI) + lithium bis(trifluoromethanesulfonyl)imide (Li-TFSI) | Liquid | 0.132 | 1.17*10−2 | 1.54*10−3 | 13 |
| LiPF6 in PC/EC/DMC | Liquid | 0.38 | 1.00*10−2 | 3.80*10−3 | 14 |
| LiClO4 dissolved in PEO | Polymer | 0.56 | 5.40*10−6 | 3.01*10−6 | 15 |
| PEO network electrolyte | polymer | 0.98 | 6.90*10−7 | 6.76*10−7 | 15 |
| Li3.838Sn0.833As0.166S4 | Solid electrolyte | 0.9999 | 1.39*10−3 | 1.39*10−3 | 12 |
| Li3.334Ge0.334As0.666S4 | Solid electrolyte | 0.9999 | 1.12*10−3 | 1.12*10−3 | This work |

Figure 3:
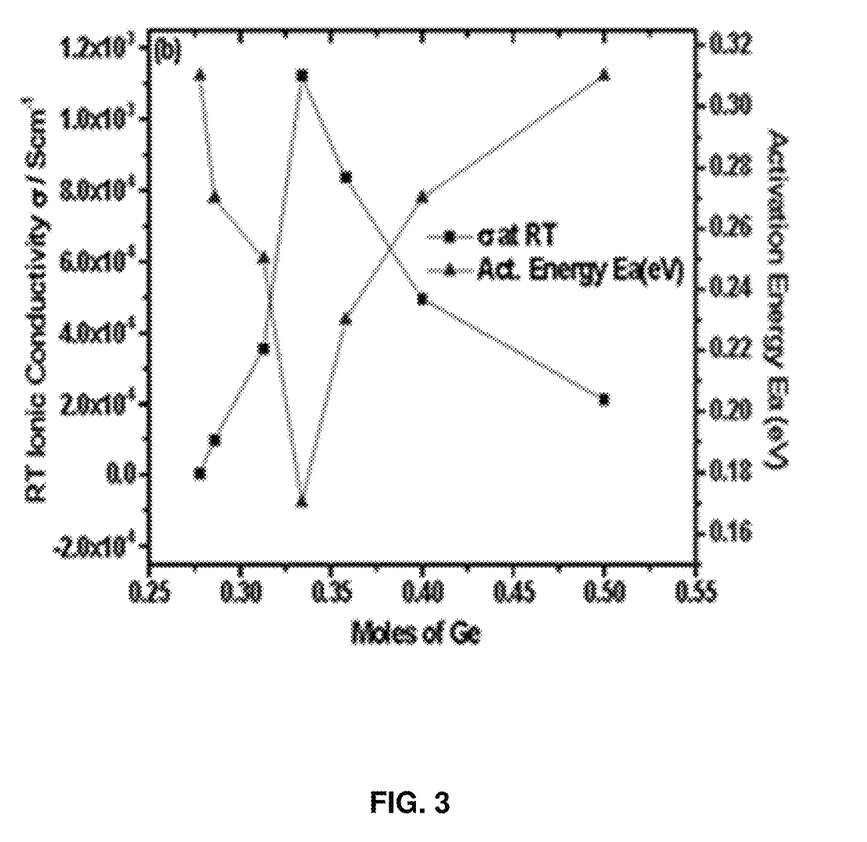
FIG. 3 is a plot of ionic conductivity vs. the molar ratios of As and Ge.

In order to understand more clearly the relation between various molar ratios of the substituent and host with that of their ionic conductivities and corresponding activation energies, a comparative analysis was carried out. FIG. 3 is a plot of ionic conductivity vs. the molar ratios of As and Ge illustrating the improvement in ionic conductivity with decreasing concentration of dopant and the maximum conductivity achieved with Ge=0.334. An opposite trend can be observed for activation energy. FIG. 3 represents plots of the composition vs. activation energy, and the conductivity of the samples. There are mainly two features apparent in this plot. First, the calculated activation energy of the sample passes through a minimum value of 0.17 eV, at Ge molar conc. 0.334, and the composition dependence of activation energy corresponds to that of conductivity, indicating that changes in the conductivity are controlled by the changes in activation energy. Second, the clear trend in a observed was that, it increases with increasing concentration of Ge from 0.27 to 0.33 in $Li_{3+x}Ge_xAs_{1-x}S_4$. It only holds good until the ratio reaches an equilibrium point at Ge=0.334 after which any further increase in Ge concentration from 0.334 to 0.50 leads to inferior ionic conductivity.

Figure 4:
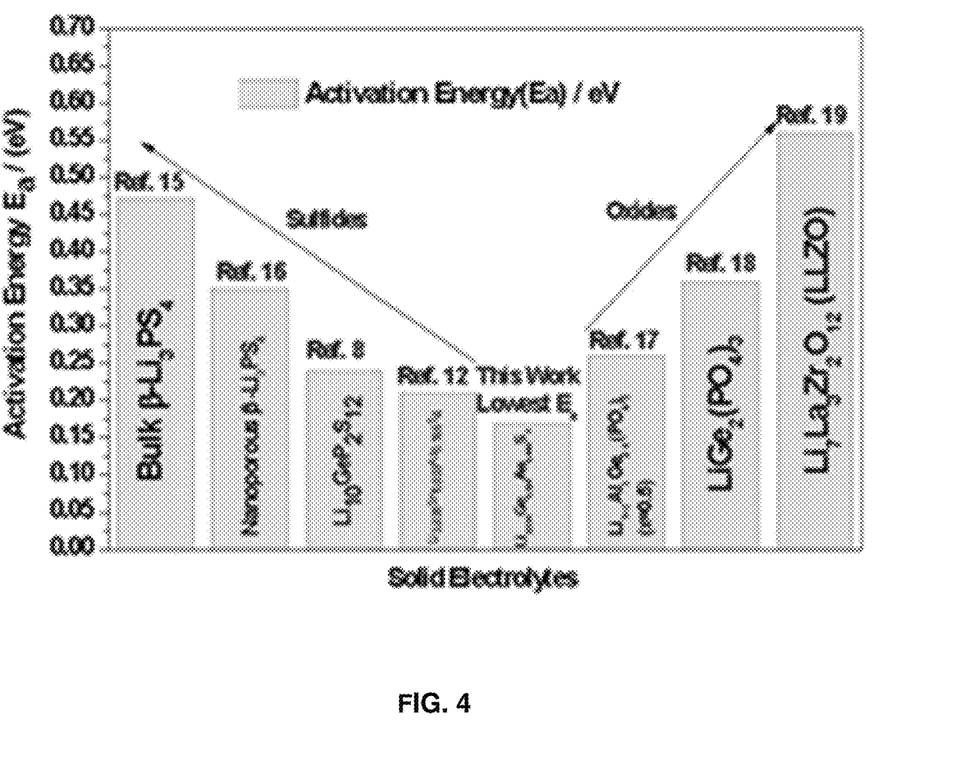
FIG. 4 is a diagram showing common solid electrolytes including sulfides and oxides and their individual activation energies.

FIG. 4 is a diagram showing common solid electrolytes including sulfides and oxides and their individual activation energies. The Ea for the composition $Li_{3.334}Ge_{0.334}As_{0.666}S_4$ showed the lowest value among all the Li ion conductors which is comparable to the activation energy of an extensively studied high conduction sodium ion conductor sodium β-alumina and a recently reported glass ceramic conductor. This means the solid electrolyte of the invention would behave as an excellent ionic conductor and easy hops are possible for a cooperative conduction mechanism.

In aliovalent substitution, solid solutions are formed when ions are substituted by other ions of different valency or charge, which consequently causes additional changes in the lattice such as (i) creation of interstitials or vacancies, or (ii) introduction of electrons or holes to pre-serve the electron neutrality. It is more reasonable to assume the former condition applies in this case since no transition elements exist as a constituent of the solid electrolyte $Li_{3+x}Ge_xAs_{1-x}S_4$ (where, x=0 to 0.500) which would contribute to the creation of electrons or holes in the composition.

Figure 5:
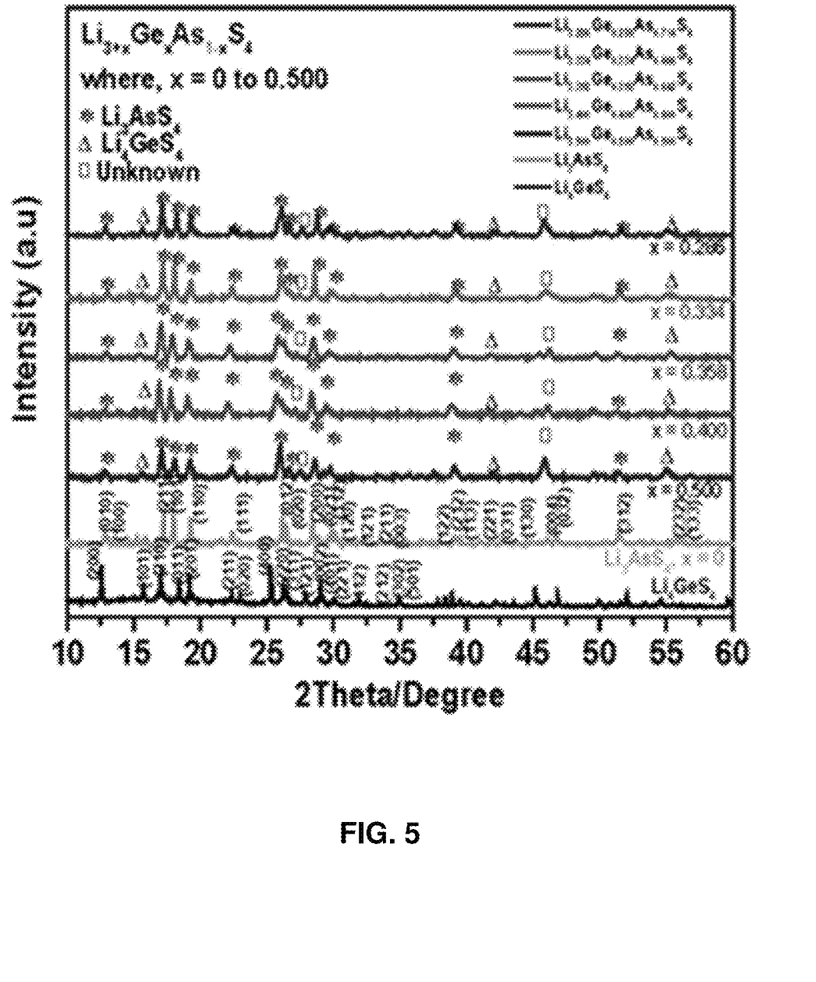
FIG. 5 is a plot of XRD patterns of $Li_4GeS_4$ and Ge doped $Li_3AsS_4$, $Li_{3+x}Ge_xAs_{1-x}S_4$ (where, x=0 to 0.500).

In order to further explain the cause of the variation in conductivity behavior according to the concentration of substituent under identical synthesis conditions, specific structural characterization of the crystal structure was taken. FIG. 5 is a plot of XRD patterns of $Li_4GeS_4$ and Ge doped $Li_3AsS_4$, $Li_3AsS_4$, $Li_{3+x}Ge_xAs_{1-x}S_4$ (where, x=0 to 0.500) showing solid solution formation with Ge doping on $Li_3AsS_4$. FIG. 5 shows a comparative analysis of XRD spectra of various compositions of the solid electrolytes with systematic variation in the dopant concentration. The XRD patterns of the $Li_{3+x}Ge_xAs_{1-x}S_4$ (where x=0 to 0.500) solid electrolytes of the invention demonstrate that the as-synthesized powders are well-crystallized with a strong x-ray diffraction peak at 2θ=17.04° and other prominent diffraction peaks at 2θ=25.76° for all the compositions. All XRD patterns (FIG. 5) show that the matrix of $Li_{3+x}Ge_xAs_{1-x}S_4$ (where x=0 to 0.5) is $Li_3AsS_4$, orthorhombic crystal structure. A series of peaks from 2θ of 10 to 35 are assigned for $Li_3AsS_4$ as follows: 12.8° (010); 13.05° (100); 17.23° (210); 17.98° (101); 19.29° (110); 22.38° (111); 22.87° (002); 26.15° (012); 26.48° (020); 28.41° (200); 29.84° (112); 30.15° (120); 32.26° (121); 33.50° (211); and 34.41° (003). The other prominent peaks are at 39.07° (212); 44.51° (222); 46.69° (032), and 51.42° (312).

The peaks for the crystal structure $Li_4GeS_4$ can be compared with the literature data reported elsewhere. Apart from these peaks, there are additional peaks, appearing at 2θ=14.40°, 15.59°, 42.05° and 49.53° which indicate solid solutions arising from the Ge substitution in $Li_3AsS_4$. The patterns also show the unknown peaks at 27.46° and 45.85° which can be attributed to new phases in the lattice.

The substitution creates interstitials or vacancies that account for the enhanced ionic conductivity in Ge substituted samples. In heterovalent or aliovalent substitution, if the replaceable cation of the tetrahedral center of the anion, i.e. $[AsS_4]^{3-}$, has a lower charge than that of the dopant, i.e. $[GeS_4]^{4-}$, host structure has lower charge than that of the dopant, vacancies are created in order to preserve the electroneutrality which enhances the overall performance of the crystal lattice.

Figure 6:
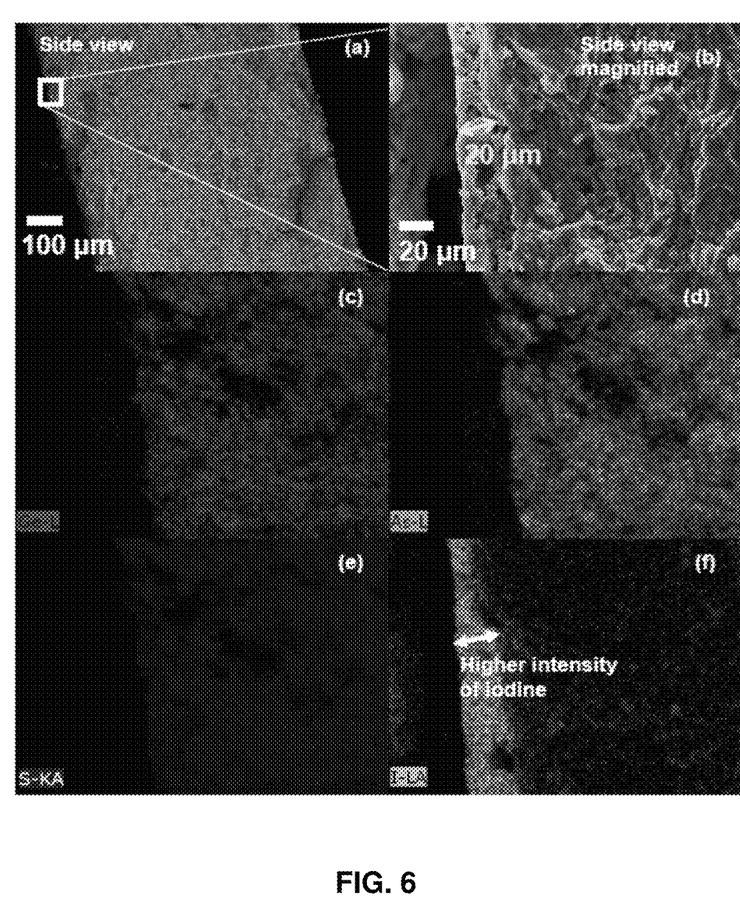
FIG. 6 is scanning electron microscopy images (A & B) and elemental X-ray maps of $LiBH_4$+LiI coated $Li_{3.334}Ge_{0.334}As_{0.666}S_4$ pellet (C—F) respectively.

A significant feature of an all-solid-state battery with solid electrolyte is that it can employ a Li metal anode without the deleterious dendritic Li deposition typically seen in Li cells employing organic liquid electrolytes. Although some recently discovered sulfide-based solid electrolytes have sufficient ionic conductivity comparable to that of liquid electrolytes, the metalloids Ge and Sn that impart the high Li-ion conductivity cause the incompatibility of these new materials with metallic Li. The materials identified in this work are also incompatible with metallic Li. Taking the advantage of its solid form, it is possible to modify or passivate the surface of the electrolyte to achieve good compatibility with metallic Li. As noted the solid electrolyte was passivated by using a facile surface coating technique. The approach was to chemically passivate the surface of the solid electrolyte pellet of $Li_{3.334}Ge_{0.334}As_{0.666}S_4$ with a Li-compatible composite of $3LiBH_4.LiI$ in THF solvent, although other passivating compositions and methodologies are possible. The THF was removed by heating the coated pellet up to 170° C. This surface passivation phenomenon was evaluated by morphological analysis via FESEM imaging and EDAX x-ray mapping techniques of cross section images. FIG. 6 is scanning electron microscopy images (A & B) and elemental X-ray maps of $LiBH_4$+LiI coated $Li_{3.334}Ge_{0.334}As_{0.666}S_4$ pellet (C—F) respectively taken for a cross section image of the sample. FIG. A is a lower magnification showing the cross section of the membrane, while B shows a higher magnification of the surface region. For C, D, E, and F, these are individual elemental maps of the exact same area of the sample shown in figure B. With these maps it is evident that iodine (part F) is confined to the 20 micrometer passivation layer, while the Ge, As, and S (parts C, D, E) are found in the underlying bulk of the electrolyte. The phases are selected by setting elemental chemistry criteria. These phases are then assigned a color, where this color is then modified by the electron image grey level information to produce the final image. Maps collected at 20 keV, Magnification: 1507.59387x. FIG. 6 shows FESEM images and elemental maps of the $3LiBH_4.LiI$ surface coated $Li_{3.334}Ge_{0.334}As_{0.666}S_4$. A passivation layer was observed on the solid electrolyte surface. The pellet has a total thickness estimation of ~750 μm with a coating thickness of ~20 μm each side. The representative FESEM images in FIG. 6 (A & B) confirm the coating forms a homogeneous and continuous protective layer throughout the pellet surface. A close examination of the roughened surface revealed a visible texture difference between the $Li_{3.334}Ge_{0334}As_{0.666}S_4$ and the $3LiBH_4.LiI$ layer. The protective layer acts as a dense artificial solid electrolyte inter-phase (ASEI) between the solid electrolyte and the reactive lithium metal. The X-ray mapping results presented in FIG. 6 (C—F) reveals the artificial solid electrolyte inter-phase is spatially distributed. Iodine is most prominently present at the edges whereas it is almost absent at the body of the pellet. The principal elements germanium, arsenic, and sulfur are discretely distributed throughout the pellet surface except the edges where, Iodine is in highest concentration. There is no doubt that such a dense passivation layer can efficiently block access of the solid electrolyte with metallic lithium and eliminate cell shunting path(s). The EDAX x-ray maps and the FESEM micrographs reveal that the artificial solid electrolyte inter-phase on the pellet is a very useful tool in addressing the surface engineering of the solid electrolyte pellet to impart lithium metal compatibility.

Figure 7:
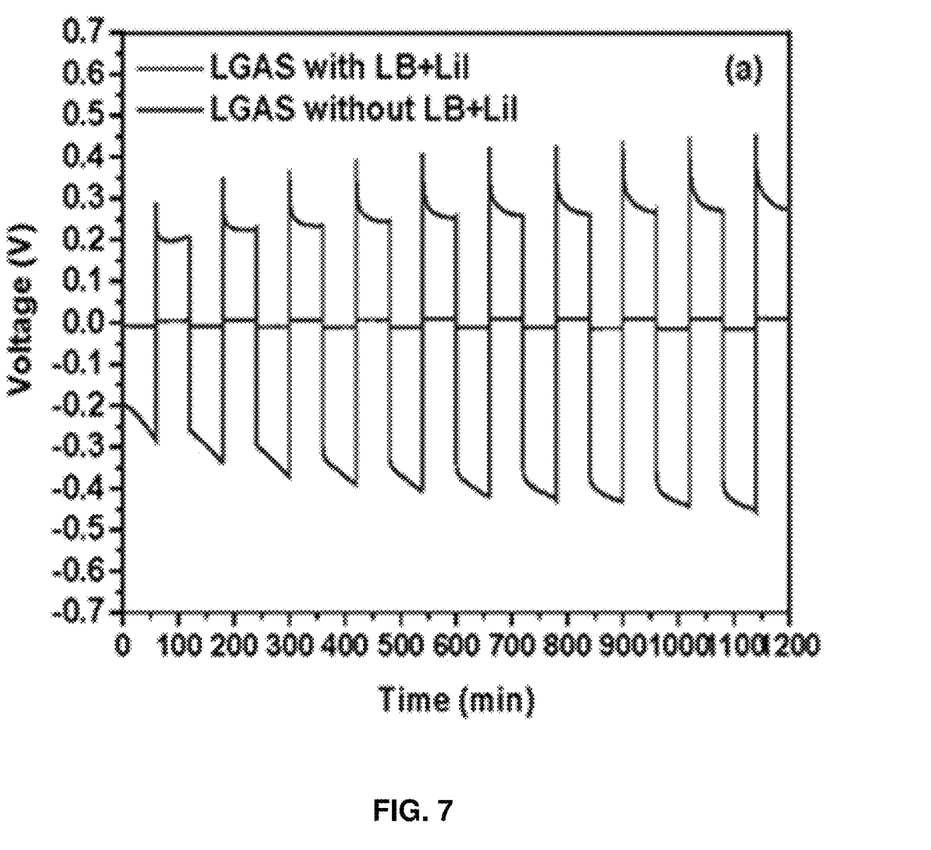
FIG. 7 is a plot of voltage (V) vs. time (min) for a $Li_{3.334}Ge_{0.334}As_{0.666}S_4$/Li symmetric cell with and without a 3LiBH$_4$.LiI (LB+LiI) coating showing lithium cyclability at a current density of 0.1 mA/cm$^2$ at ambient conditions (25° C.).

FIG. 7 is a plot of voltage (V) vs. time (min) for a Li/Li$_{3.334}$Ge$_{0.334}$As$_{0.666}$S$_4$/Li symmetric cell with and without 3LiBH$_4$.LiI (LiB+LiI) coating showing lithium cyclability at a current density of 0.1 mA/cm$^2$ at ambient conditions (25° C.). The pristine pellet is not compatible with metallic Li electrodes. The cell voltage is spiky as a result of the interfacial reaction between the solid electrolyte and the newly deposited metallic Li. The polarization voltage profile shows continuous increase in potential in the later cycles which could be due to further increased interfacial resistance between lithium and the solid electrolyte. A smooth cell voltage with very minimal interfacial resistance was achieved after the 3LiBH$_4$.LiI coating was applied. The coating material 3LiBH$_4$.LiI, is a good ionic conductor that is compatible with metallic Li.

Figure 8:
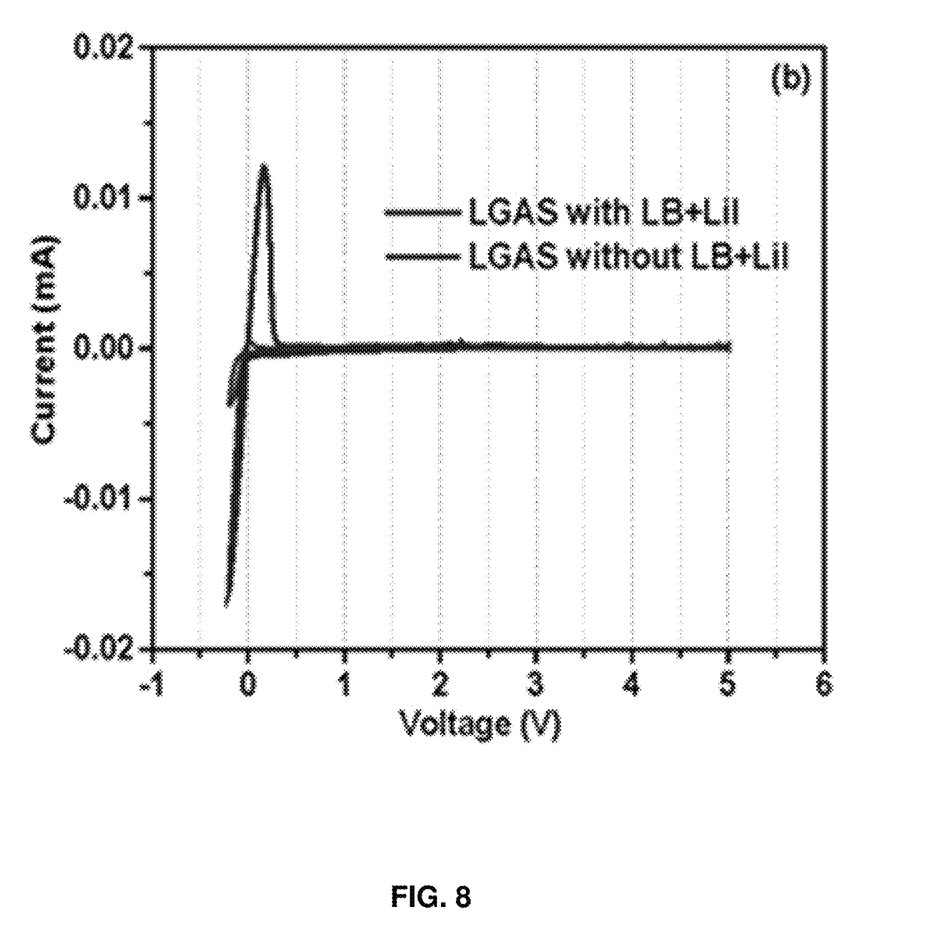
FIG. 8 is a plot of current (mA) vs. voltage (V) with and without 3LiBH$_4$.LiI coated on Li/Li$_{3.334}$Ge$_{0.334}$As$_{0.666}$S$_4$/Pt cell, where Li and Pt serve as the reference/counter and working electrode respectively.

The compatibility of the coated electrolyte with metallic lithium was further proved by the cyclic voltammetry (CV) measurement of Li/Li$_{3.334}$Ge$_{0.334}$As$_{0.666}$S$_4$/Pt cell. FIG. 8 is a plot of current (mA) vs. voltage (V) with and without 3LiBH$_4$.LiI coated on Li/Li$_{3.334}$Ge$_{0.334}$As$_{0.666}$S$_4$/Pt cell, where Li and Pt serve as the reference/counter and working electrode respectively. Li was the working and pseudo reference electrode and Pt was the counter electrode. The potential was scanned from −0.5 to 5.0 V vs. Li/Li$^+$ at a scan rate of 1 mVs$^{-1}$. The superionic Li$_{3.334}$Ge$_{0.334}$As$_{0.666}$S$_4$ solid electrolyte has a broad electrochemical window up to 5V. The cathodic current occurred right at 0V. This fact indicates that no side reaction occurred during the lithium deposition. A sharp anodic peak was observed between 0 and 0.3V referring to lithium dissolution. A small peak was observed at 0.53 V, which is attributed to the dealloying of Li—Pt alloy formed at the electrochemical cycling. No additional peak was observed in the entire 5V electrochemical window. As opposed to the CV data of an uncoated pellet cycled under similar conditions, the coated pellet did not show any oxidation or reduction reactions after cycling (FIG. 8). The chemical reaction of lithium with the solid electrolyte was clearly visible on an uncoated pellet as opposed to the surface of the passivated pellet where the coating protected the solid electrolyte from reacting with lithium metal. The results suggest there are possible materials like 3LiBH$_4$.LiI which can be compatible with lithium and still remain intact and highly protective during the cycling of the battery.

Crystalline electrolytes of Li$_{3+x}$Ge$_x$As$_{1-x}$S$_4$ were prepared by mechanical mixing and subsequent heat treatment in the composition range 0≤x≤0.5. All the resulting crystals showed higher conductivity than their parent counterparts. The room temperature conductivity increased with increasing the Ge concentration and it reached to 1.12×10$^{-3}$ Scm$^{-1}$ at a substitution level of 33.4% % of Ge on the Li$_3$AsS$_4$ lattice. The resulting phase Li$_{3.334}$Ge$_{0.334}$As$_{0.666}$S$_4$ showed Li$^+$ transference number 0.9999 showing Li$^+$ as the only mobile species. The activation energy Ea of this phase was 0.17 eV which was one of the lowest conduction Ea among the lithium-ion conductors currently being studied. Such exceptionally low activation energy suggests this electrolyte would show a steady performance in a device under a broad temperature range. Although chemical compatibility with metallic Li was compromised by the Ge and As atoms, surface passivation of the solid electrolyte resulted in protective artificial solid electrolyte inter-phase layer which preserves the solid electrolyte surface and eliminates the possibilities of interfacial reactions and therefore impart excellent cyclability with metallic Li. The surface passivated phase Li$_{3.334}$Ge$_{0.334}$As$_{0.666}$S$_4$ showed excellent lithium cyclability and had wide electrochemical window up to 5V vs. Li$^+$/Li. These results demonstrate that the optimum synthesis conditions and surface engineering with suitable material choices can produce high conduction sulfide solid electrolytes with high Li$^+$ ion conductivity, a lithium transport number 0.9999 comparable to that of liquid electrolytes, exceptionally low activation energy, and metallic Li compatibility. This invention can be embodied in other forms without departing from the spirit and essential attributes thereof.

We claim:

1. A solid electrolyte for a lithium battery, comprising Li$_{3+x}$Ge$_x$As$_{1-x}$S$_4$ where x=0 to 0.50, and having an ionic conductivity of greater than 1 mScm$^{-1}$ at 27° C. and an activation energy of no more than 0.3 eV.

2. The solid electrolyte of claim 1 wherein x=0.25 to 0.5.

3. The solid electrolyte of claim 1, wherein x=0.3 to 0.4.

4. The solid electrolyte of claim 1, wherein x=0.33.

5. The solid electrolyte of claim 1, wherein the electrolyte has an ionic conductivity of at least 1.12 mScm$^{-1}$ at 27° C.

6. A lithium battery comprising a solid electrolyte, the solid electrolyte comprising Li$_{3+x}$Ge$_x$As$_{1-x}$S$_4$, wherein x=0 to 0.50, and having an ionic conductivity of greater than 1 mScm$^{-1}$ at 27° C. and an activation energy of no more than 0.3 eV.

7. The lithium battery of claim 6, wherein x=0.25 to 0.50.

8. The lithium battery of claim 6, wherein x=0.3 to 0.4.

9. The lithium battery of claim 6, wherein x=0.33.

10. The lithium battery of claim 6, wherein the electrolyte has an ionic conductivity of at least 1.12 mScm$^{-1}$ at 27° C.

11. A solid electrolyte for a lithium battery, comprising LiAsS$_4$ wherein ½ to ⅔ of the As is substituted with Ge.

12. A lithium battery comprising a solid electrolyte, the solid electrolyte comprising LiAsS$_4$ wherein ½ to ⅔ of the As is substituted with Ge.

13. A method of making a lithium battery, comprising the steps of:
providing an anode and a cathode;
positioning between the anode and the cathode a solid electrolyte, wherein the electrolyte comprises Li$_{3+x}$Ge$_x$As$_{1-x}$S$_4$ where x=0 to 0.50, and having an ionic conductivity of greater than 1 mScm$^{-1}$ at 27° C. and an activation energy of no more than 0.3 eV.

* * * * *